June 7, 1966 R. A. POWERS ET AL 3,255,045
ELECTRIC CELL
Filed Aug. 31, 1960
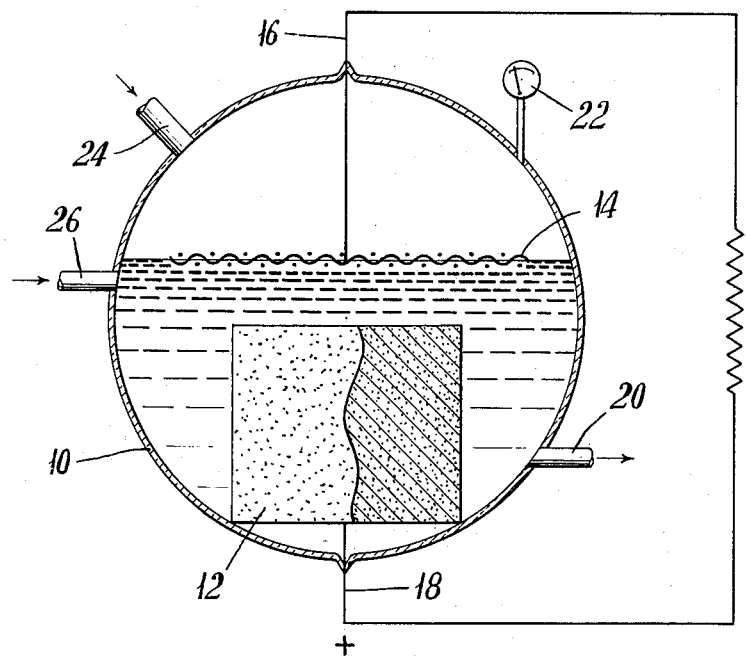
INVENTORS
ROBERT A. POWERS
DOUGLAS R. ALLENSON
ALBERT C. STEWART
BY
ATTORNEY

3,255,045
ELECTRIC CELL

Robert A. Powers, Lakewood, and Douglas R. Allenson and Albert C. Stewart, Cleveland, Ohio, assignors to Union Carbide Corporation, a corporation of New York
Filed Aug. 31, 1960, Ser. No. 53,230
4 Claims. (Cl. 136—86)

This invention is concerned with a device in which an electrolyte-soluble depolarizer may be employed in conjunction with suitable electrodes to produce electrical power.

In the prior art the Daniell cell is a device which uses two soluble redox systems having common ion electrodes in which gravity separation is used to separate the anolyte from the catholyte phase. Since its operation is dependent upon separation of species, shaking destroys cell operation, and for this reason the Daniell cell has not gained wide industrial acceptance.

It is then the principal object of the present invention to provide an electrochemical device employing a homogeneous electrolyte and a soluble depolarizer which will continue to operate after having been stirred or mixed.

Another object is to provide an electrochemical cell employing a single electrolyte and a soluble depolarizer in which the conventional separator between anode and cathode is not required.

Other objects, features and advantages of the present invention will appear in the course of its description.

The figure accompanying the instant specification is a schematic cross-sectional view of a cell embodying the present invention.

Referring specifically to the figure, reference character 10 indicates a vessel fabricated from material inert to the electrolyte, suitably graphite, glass or metal. Vessel 10 has in its lower part immersed in electrolyte, a porous cathode 12 having a high overvoltage for the reaction $H_2$—$H^+$. A recommended material having these properties is porous carbon. Above cathode 12 at the electrolyte interface is positioned an inert anode 14 having its upper side in contact with hydrogen gas supplied through the inlet and its lower side in contact with electrolyte. This inert electrode has a low overvoltage for the reaction $H_2$—$H^+$ and has at least on its surface a hydrogen ionization catalyst. A suitable electrode material is platinized platinum in which the finely divided platinum black serves as the hydrogen ionization catalyst. Suitable leads 16 and 18 connect the cathode and anode to the external circuit. In vessel 10, 22 is a pressure gauge, 24 is an inlet for hydrogen from a suitable external source, 26 is an inlet for electrolyte or depolarizer and 20 is an outlet for electrolyte.

When ferric ion or sulfate ion or some other soluble depolarizer is added to the electrolyte of the above cell, and hydrogen gas is supplied to its anode, the above cell will produce voltage and current consistent with the thermodynamics of the anode and cathode reactions, and with the geometry of the cell and of its electrodes. An important aspect of this cell design is that it permits the use of soluble depolarizers without the use of high resistance mechanical separators. The soluble depolarizers need not be confined to ferric ion.

A cell of the type shown was operated by adding depolarizer consisting of 0.01 M $Fe_2(SO_4)_3$ in 0.8 N $H_2SO_4$ and hydrogen introduced into the gas space defined by the upper side of the anode and the vessel walls. The cell showed a potential of 0.764 volt, and delivered a current of 1 ma. through an external load.

Many variations are possible in the size and shape of container and number, size and arrangement of the electrodes used in the present cells in the soluble depolarizer, and in the electrolyte employed. For example, the electrolyte may, in general, be any conducting aqueous solution acid or basic in which the depolarizer is soluble. The depolarizer may be any electrolyte-soluble material containing a reducible ion such as ferric ion, selenate, arsenate, uranyl or other ion located below hydrogen in the electromotive series. These include $H_2SeO_3/SeO_4^=$; $HAsO_2/H_3AsO_4$; $U^{+4}/UO_2^{++}$.

What is claimed is:

1. A device for producing electrical energy comprising a sealed vessel, an electrolyte partially filling said vessel and defining a gas space therein, external means for supplying hydrogen gas to said gas space, an inert cathode immersed in said electrolyte, said cathode having a high overvoltage for the reaction $H_2$—$H^+$, an inert anode having a low overvoltage for the same reaction and having at least on the surface thereof a hydrogen ionization catalyst, said anode being located at the interface of said electrolyte and having one side exposed to contact with hydrogen gas in said gas space, an oxidized form of a soluble depolarizer in said electrolyte, said depolarizer being reduced by electrochemical action when said hydrogen gas is supplied to said gas space, and means for connecting said anode and cathode to an external circuit.

2. The device of claim 1 wherein said oxidized depolarizer is ferric sulfate.

3. The device of claim 1 wherein said depolarizer is selected from the group consisting of $H_2SeO_3/SeO_4^=$, $HAsO_2/H_3AsO_4$, $U^{+4}/UO_2^{++}$.

4. A device for producing electrical energy comprising a sealed vessel, an electrolyte partially filling said vessel and defining a gas space therein, an inert cathode immersed in said electrolyte, said cathode having a high overvoltage for the reaction $H_2$—$H^+$, an inert anode having a low overvoltage for the same reaction and having at least on the surface thereof a hydrogen ionization catalyst, said anode being located at the interface of said electrolyte and having one side exposed to contact with hydrogen gas in said gas space and the other side in contact with said electrolyte, an oxidized form of a soluble depolarizer in said electrolyte, said depolarizer being reduced by electrochemical action when said hydrogen gas is supplied to said gas space, means for supplying said hydrogen gas to said gas space and for supplying said electrolyte and depolarizer to said vessel and means for connecting said anode and cathode to an external circuit.

References Cited by the Examiner

FOREIGN PATENTS 345,118    9/1904    France.

ALLEN B. CURTIS, *Primary Examiner.*

JOHN H. SPECK, JOHN H. MACK, *Examiners.*

H. FEELEY, *Assistant Examiner.*